June 28, 1932. C. G. STRANDLUND 1,864,958
TWO-WAY PLOW
Filed March 12, 1928 4 Sheets-Sheet 2
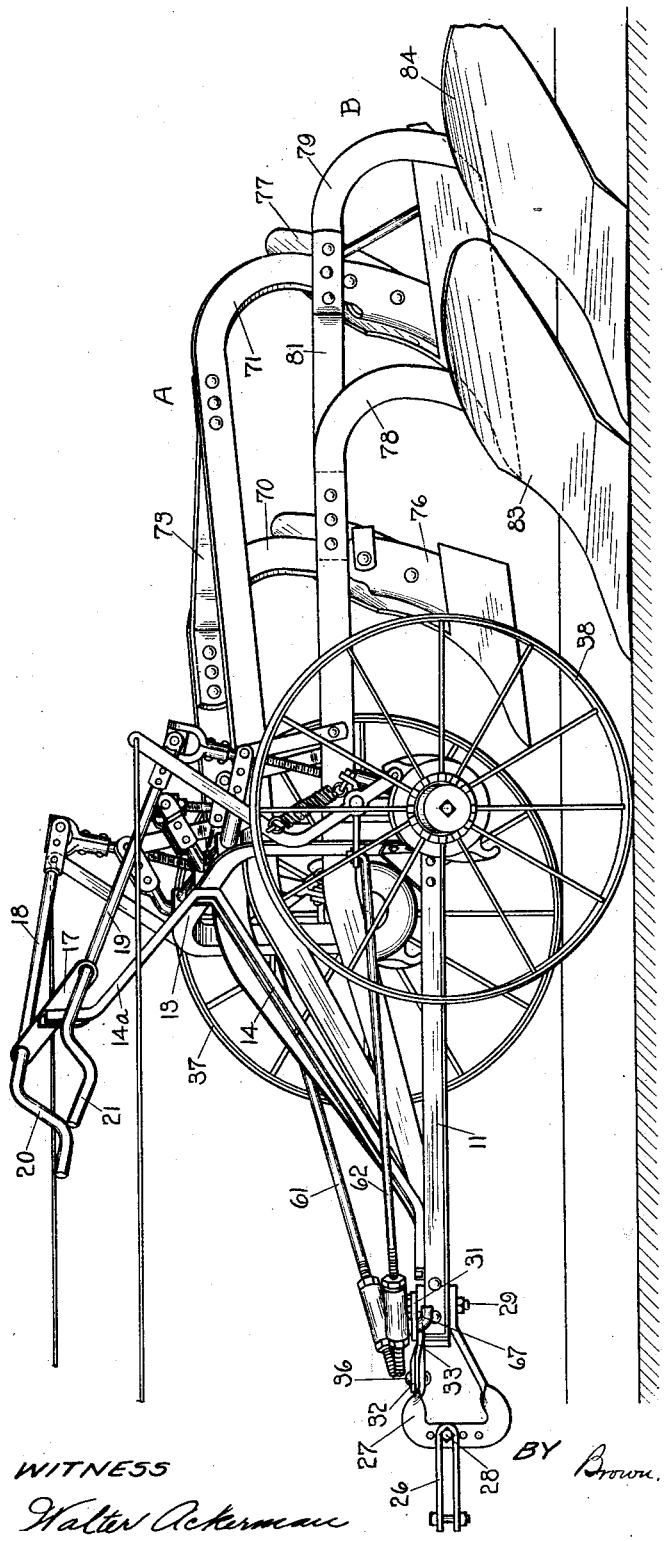
WITNESS
Walter Ackerman
INVENTOR
Carl G. Strandlund,
BY Brown, Jackson, Boettcher & Dienner
ATTORNEYS

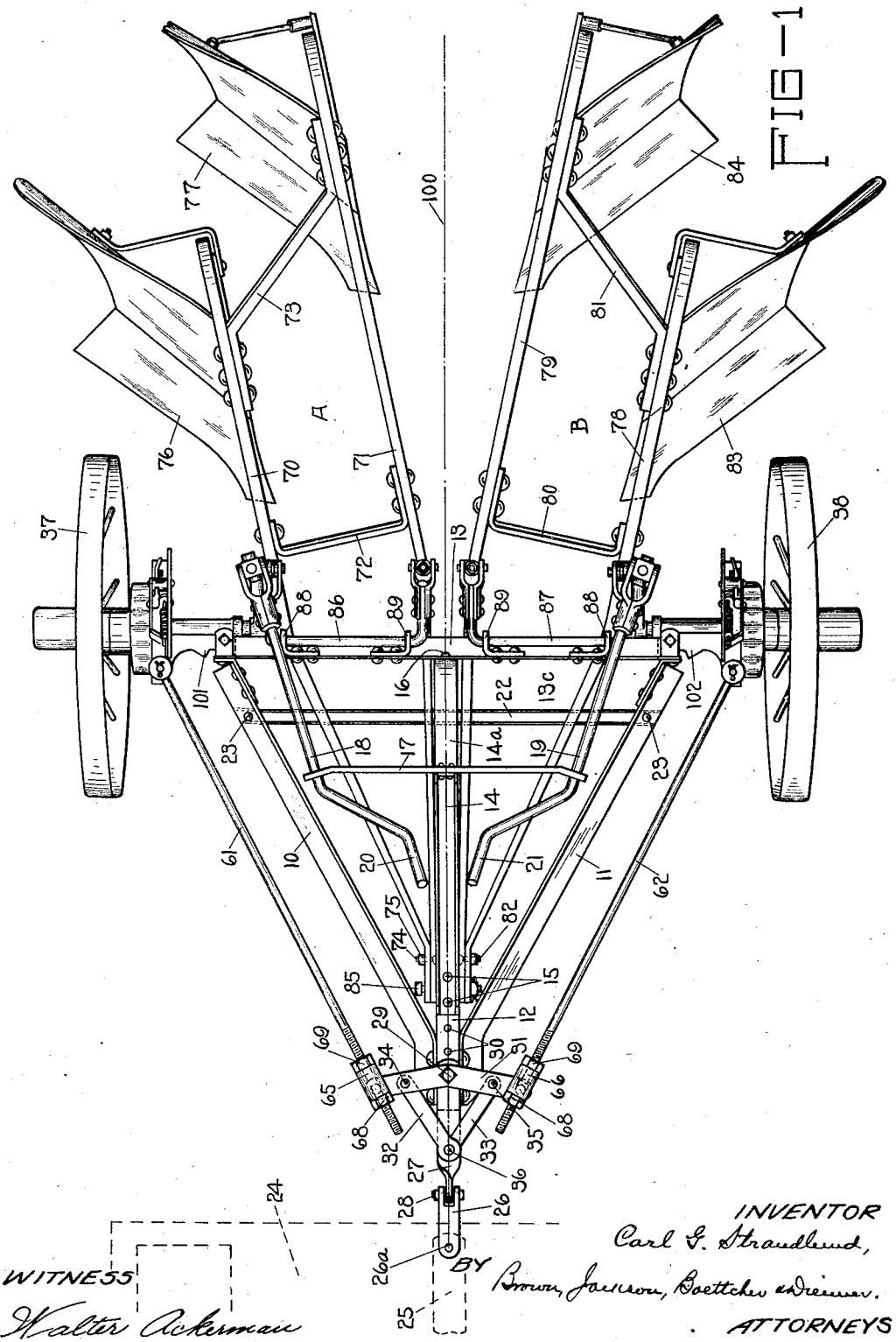

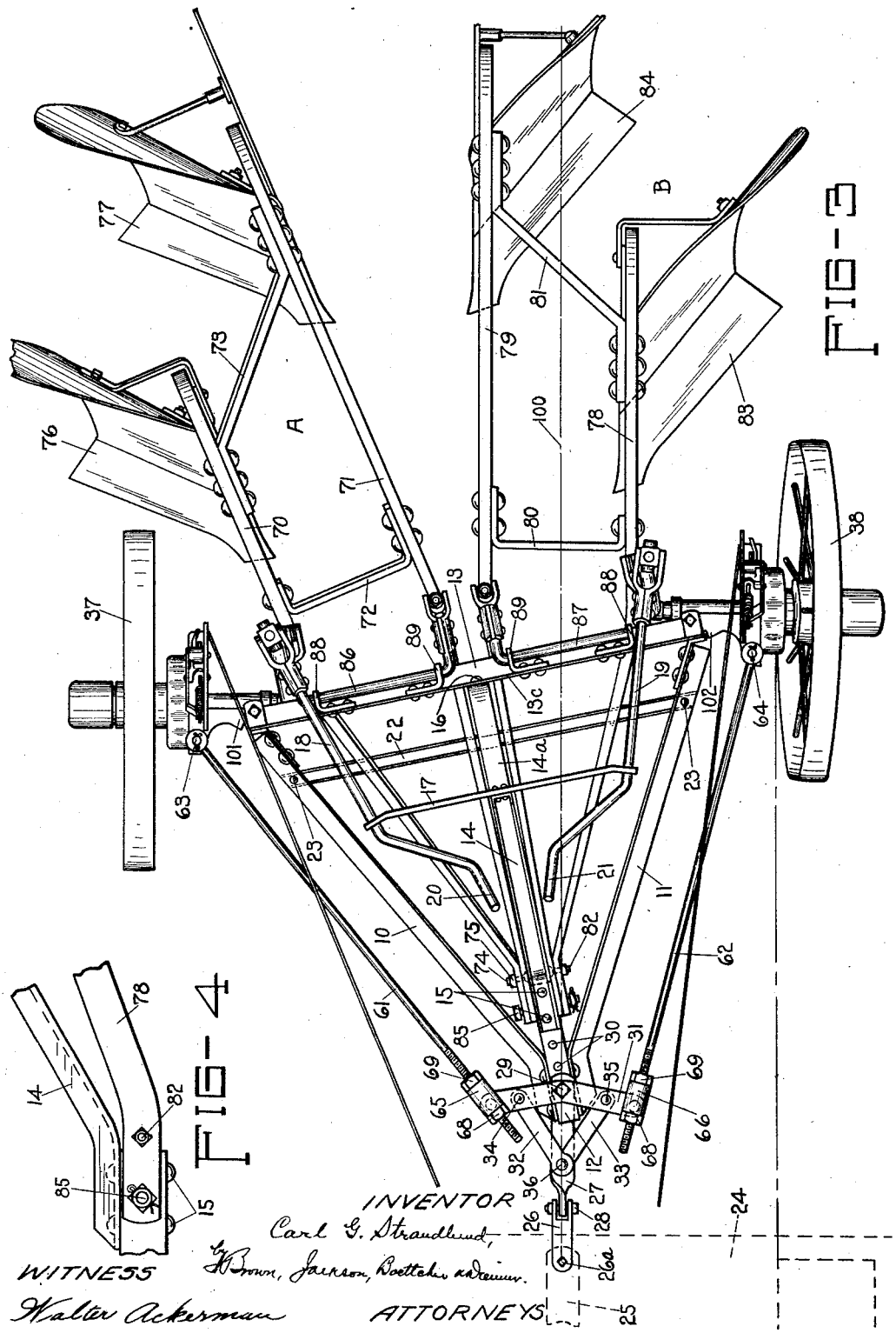

June 28, 1932.  C. G. STRANDLUND  1,864,958
TWO-WAY PLOW
Filed March 12, 1928  4 Sheets-Sheet 4
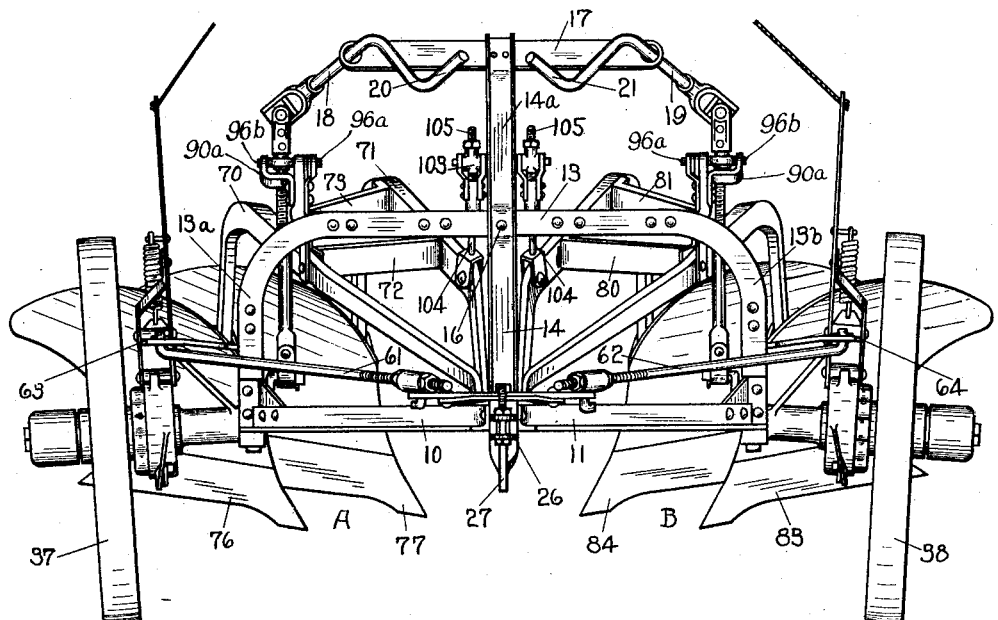
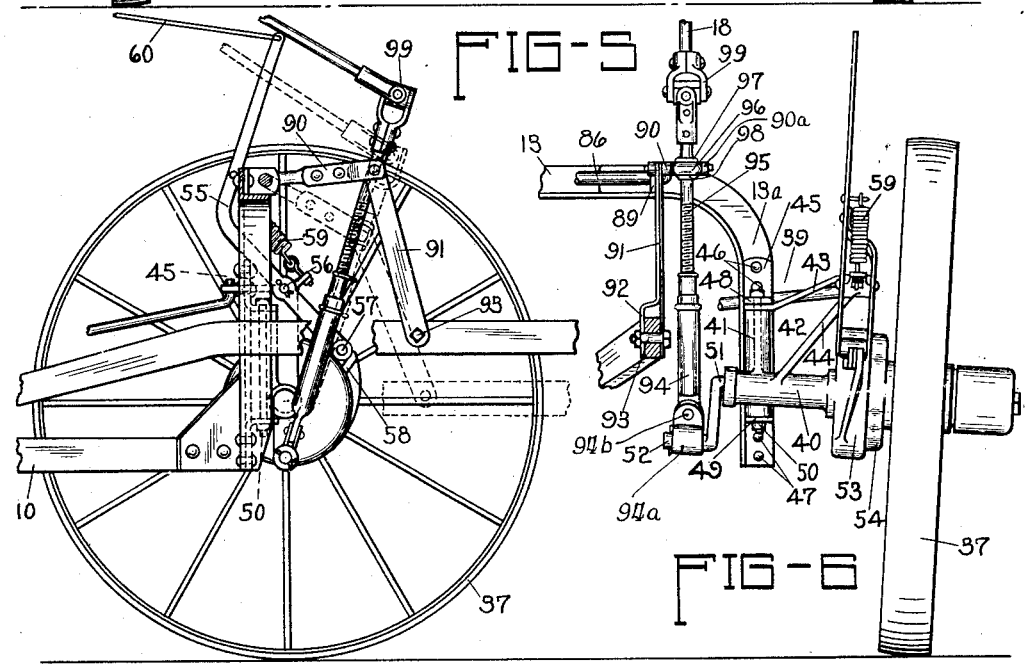
INVENTOR
Carl G. Strandlund,
BY Brown, Jackson, Boettcher and Dienner.
ATTORNEYS
WITNESS
Walter Ackerman Patented June 28, 1932

1,864,958

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

TWO-WAY PLOW

Application filed March 12, 1928. Serial No. 260,872.

This invention relates to what are known in the art as two-way plows, which is a type of plow comprising two plowing units arranged side by side, with their landsides next to each other so that they throw the furrow slice in opposite directions. The two units are arranged to be raised and lowered separately, and only one of them at a time is in operative position, the other being then raised and held in inoperative position. In using such a plow it is driven back and forth across the field, and each time the field is traversed the furrow slice is taken off the same end of the land. Such plows are intended for plowing on hillsides, where it is desirable to throw the soil downward, and in plowing irrigated fields, where it is important to keep the land in a level state and avoid dead furrows and landbacks, or ridges caused by throwing the dirt from two furrows on to an unplowed strip,—which, of course, results in the formation of two dead furrows. By the use of a two-way plow an open or dead furrow is formed at one side of the field only, and the next season the field may be plowed beginning at the opposite side, so that the previously formed dead furrow is filled with soil, thereby keeping the field level.

While two-way plows have been known and used for many years they have not proven entirely satisfactory because it has been impossible with the constructions heretofore known to keep the center of resistance of both plowing units when each is in operative position in a common line of draft; in other words, the construction has been such that shifting from one plowing unit to the other shifted the line of draft laterally with reference to the point of application of the draft to the plow, whereas the best results are obtained by maintaining the line of draft constantly in a longitudinal vertical plane coincident with the center of power of the tractor or other drawing means. To accomplish this in a two-way plow it is necessary, as above indicated, that the center of resistance of the plowing unit in service coincide with such line of draft, and in prior constructions this could not be done because the two plowing units were connected with the draft frame of the plow at opposite sides of such center line and were arranged to move up and down in parallel vertical planes.

The primary object of my present invention is to provide a two-way plow which will be free from the objections above mentioned, its construction being such that the center of resistance of either unit when in operation will coincide with a common central line of draft. Another of my objects is to provide improved power lift mechanism which will be well adapted for use in connection with two-way plows, as well as in connection with other forms of agricultural machinery employing furrow openers adapted to be raised and lowered for moving them out of or into operative position. A further object is to improve the construction and operation of two-way plows in various other respects which will be pointed out in the course of this specification. I accomplish these objects as hereinafter described and as illustrated in the accompanying drawings which show the form in which I prefer to embody by improvements. What I regard as new is set forth in the claims.

Before proceeding to a description of the construction shown it should be explained that in such description the term "gang" will be employed as designating each plowing unit whether such unit comprise a single beam with its attached furrow opener or a plurality of beams and furrow openers rigidly connected together to move in unison.

In the accompanying drawings,—

Fig. 1 is a plan view of my improved plow showing both gangs in their elevated or inoperative position, which is the position the parts assume for transport, the rear portion of a tractor being indicated in dotted lines;

Fig. 2 is a side elevation showing the plow with the left hand gang in operative position and the right hand gang in its elevated or inoperative position;

Fig. 3 is a plan view of the plow with the parts arranged in the same way as shown in Fig. 2, the rear portion of a tractor being indicated in dotted lines;

Fig. 4 is a detail showing in side elevation the front portion of the draft frame and the front portion of one of the beams;

Fig. 5 is a front elevation of the plow with the gangs in transport position;

Fig. 6 is a partial vertical cross-section corresponding to a rear elevation of the parts shown in Fig. 7, showing the manner of mounting the ground wheels and the power lift mechanism; and Fig. 7 is a partial longitudinal vertical section corresponding to a side elevation of Fig. 6.

My improved plow comprises a rigid draft frame which is best made triangular in form and comprises two forwardly converging bars 10, 11 here shown as being made of angle iron, the forward ends of said side bars being rigidly connected together at opposite sides of an intermediate draft bar 12. The rear ends of the side bars 10, 11 are rigidly connected with the downturned lower end portions of an arch bar 13 which extends transversely of the draft frame and forms the third side of the triangular frame. A brace 14 preferably in the form of a channel bar has its forward end riveted or otherwise fixedly secured to the rear portion of the draft bar 12 adjacent to the apex of the triangle by rivets 15, and extends rearward and upward to the central portion of the arch bar 13 with which it is fixedly connected by rivets 16 shown in Fig. 3. From this point the brace 14, in the illustrated construction, extends upward and forward as shown at $14^a$ in Fig. 2 and supports a cross-bar 17 that serves to support operating rods 18, 19 and cranks 20, 21 at their forward ends. These operating rods are used to manually adjust the depth of plowing, as will be hereinafter described, and they extend through suitable holes in the end portions of the cross-bar 17 so that they may be rotated freely by means of their respective cranks, which extend far enough forward so that an operator on the tractor by which the plow is drawn may conveniently operate them. The rear portions of the side bars 10, 11 are braced by a cross-beam 22, preferably in the form of a channel bar, which, as shown in Fig. 3, has its end portions rigidly secured to the rear end portions of the side bars as by rivets 23.

The draft frame is intended to be connected at the front to a tractor 24, indicated by dotted lines in Figs. 1 and 3, wherein 25 indicates the usual draw bar of the tractor, which is best located in the center line thereof and near its rear end. This draw bar is connected by a laterally swinging link 26 and vertical pivot $26^a$ with a clevis 27, the forward or loop portion of which is twisted to lie in a vertical plane and is connected by a horizontal bolt 28 with the link 26, which is preferably forked to receive it, as shown in Fig. 1. The clevis 27 is pivotally connected at or near its rear end with the draft bar 12 by means of a vertically disposed pivot 29 which may pass through any one of several vertical holes 30 in said draft bar, as shown in Fig. 1. Also mounted on the pivot 29 is a cross-head 31 which is held in fixed relation to the clevis 27 by diagonal links 32, 33. The rear ends of said links are connected to intermediate portions of the cross-head 31 at opposite sides of the pivot 29 by bolts 34, 35, and their forward ends converge and are connected with the forward portion of the clevis 27 by a vertical bolt 36. Thus the link 26, the clevis 27 and the cross-head 31 together form a laterally rigid draft connection or steering member which may as a unit swing laterally about the pivot $26^a$, and the draft frame comprising the draft bar 12, the side members 10, 11 and the arch bar 13 may be swung angularly with reference to said draft connection about the vertical pivot 29.

The draft frame is supported on dirigible ground wheels 37, 38 carried at the opposite ends of the arch bar 13, as best shown in Fig. 1. These wheels are arranged to swing angularly about vertical axes with reference to the arch bar as shown in Fig. 3, and to this end they are mounted on approximately horizontal spindles carried by brackets that are secured to the vertically disposed end portions $13^a$, $13^b$ of the arch bar 13. One of these brackets is shown in detail in Fig. 6 wherein 39 indicates the bracket as a whole, 40 an approximately horizontal sleeve that forms the lower portion thereof, 41 an upright sleeve that extends upwardly from the inner end portion of the sleeve 40, preferably being formed integral therewith, and 42 a laterally extending wing composed of outwardly converging bars 43, 44 that are united at their outer ends to make a rigid structure. The particular construction of these brackets may be varied considerably, provided they are so designed as to function in the manner hereinafter described. Each of said brackets is secured to the rear face of one of the end portions of the arch bar 13 by means of a plate 45 firmly secured to the arch bar and also to one of the side members, 10 or 11, of the draft frame. In the construction shown the plates 45 are secured at their upper ends to the arch bar by rivets 46, and to the side members of the draft frame by rivets 47, as shown in Figs. 5 and 6. Each of these plates is provided with rearwardly projecting horizontal lugs 48, 49 spaced apart far enough to receive the bracket 39 between them, as shown in Fig. 6, and the bracket is pivotally mounted between said lugs on a vertical pivot 50 so that it may swing horizontally about a vertical axis, thereby swinging the wheel 37 or 38 carried by it angularly with reference to the arch bar 13.

Journaled in each of the horizontal sleeves 40 of the brackets 39 is a crank shaft 51 having a crank 52 at its inner end and a clutch member 53 at its outer end, the latter clutch member having a bearing against the outer end face of the sleeve 40, as shown in Fig. 6. This clutch member is adapted to cooperate with a clutch member 54 secured to the hub of the adjacent wheel, at the inner side thereof, as shown in Fig. 6. The clutch members 53, 54 are of the well-known half revolution type commonly used on power lift plows for raising and lowering the plow bottoms;— that is to say, they are normally disconnected so that the wheel that carries the clutch member 54 may normally rotate freely without rotating the clutch member 53, this normal condition being maintained by means of a trip lever that automatically functions to disconnect the clutch members at the end of each half revolution of the clutch and hold them disconnected until the trip lever is momentarily again actuated by the operator. As the construction of such clutches is well-known in the art it is unnecessary to illustrate or describe the same in detail, but in the drawings one of the trip levers is best shown at 55 in Fig. 7, said lever being pivotally mounted upon the bracket 39, as by a pivot 56 carried by the wing 42, so that the lower end of the trip lever overlies the periphery of the clutch member 53. Preferably at its lower end said trip lever carries a roller 57 that rides on the peripheral portion of the clutch member 53 and is adapted to engage a dog 58 that forms part of the clutch mechanism and hold it out of operative position. A spring 59, best shown in Figs. 6 and 7, normally holds the roller 57 in contact with the surface of the clutch member 53, and returns it to such position after each actuation of the trip lever. Said lever is provided with an operating rod or cord 60, shown in Fig. 7, by which it may be pulled forward to move the roller 57 out of engagement with the dog 58 and permit the clutch members to be operatively connected. When such operative connection is made the rotation of the ground wheel, 37 or 38, that is connected with such clutch member will cause the crank 52 to rotate, and, through suitable lifting connections hereinafter described, will lift the plow bottoms at that side of the plow, or permit them to drop into operative position, depending upon the the position they occupy at the time the trip lever is actuated. As the trip lever and clutch mechanism associated with each ground wheel are carried by the bracket 39, when such ground wheel is swung angularly with reference to the arch bar 13 they swing with it and are not affected by such swinging movement.

As shown in Fig. 3, the brackets 39 at the opposite sides of the plow, and the ground wheels mounted thereon, are connected respectively to the opposite end portions of the cross-head 31 by means of connecting rods 61, 62 which at their rear ends are pivotally connected with said brackets by vertical pivots 63, 64 connected with the outer end portions of the wings 42, as best shown in Figs. 5 and 6. These pivots are preferably formed by bending the rear ends of the rods 61, 62 upward, as shown in Fig. 5. The forward ends of said rods are adjustably connected with the outer end portions of the cross-head 31 by means of sleeves 65, 66 pivotally connected with the cross-head to rock about vertical axes, said sleeves being preferably provided with downwardly extending horns 67, shown in Fig. 2, that are journaled in holes provided to receive them in the ends of the cross-head. This permits the sleeves to turn about vertical axes and enables them to be readily disconnected. The forward ends of the rods 61, 62 pass through said sleeves, respectively, and are adjustably held against endwise movement with respect thereto by nuts 68, 69 screwed on said rods at opposite sides of the sleeve, as shown in Fig. 3. By this construction the ground wheels may be adjusted with reference to each other, so that they may either be arranged to run in parallel planes, or to toe in slightly if that be preferred. The rods 61, 62 hold the brackets with which they are respectively connected at a fixed distance from the corresponding end of the cross-head 31, but swinging of said cross-head about the pivot 29 will move said brackets and wheels fore and aft with respect to each other, as illustrated in Fig. 3, the wheel at the operating side of the plow being moved rearwardly with respect to the other wheel as the plow bottoms at that side are lowered into operative position, as will be more fully hereinafter explained.

In the illustrated construction I have shown the plow as comprising two gangs A and B, each gang being made up of two beams the rear portions of which are parallel, while their forward ends converge and are secured together. Each of said beams carries a plow bottom arranged with its landside at the inner side of the plow. Thus the bottoms of the two gangs turn their respective furrow slices in opposite directions. In the drawings 70, 71 indicate the beams of gang A, which beams are braced together by transverse and diagonal braces 72 and 73, respectively. Said beams are connected together at their forward ends by a bolt 74 the head of which is countersunk in the beam 71, the bolt passing through said beam and beam 70 where it carries a nut 75. The plow bottoms of gang A are indicated by 76, 77. The beams of gang B are indicated by the numerals 78, 79, said beams being secured together by cross braces 80, 81 similar to the braces 72, 73, and the forward ends of said beams are connected by a bolt 82 similar to the bolt 74. The bottoms of gang B are indicated by 83, 84.

As best shown in Figs. 1 and 3, the gangs

A, B are arranged at opposite sides of the median line of the plow and their respective beams are so shaped that the forward portions of the beams 71, 79 are substantially parallel with each other and with the draft beam 12 to which they are pivotally connected by a horizontal pivot bolt 85. As shown in Fig. 1, the forward ends of beams 71, 79 bear against opposite side faces of said draft beam at a point a short distance back of the vertical pivot 29, and the pivot bolt 85 extends through the beam ends and through the draft beam so that the gangs are adapted to swing vertically about said pivot as a center. Adjacent to the transverse vertical plane of the arch bar 13 the beams 71, 79 are bent laterally away from each other so that the two gangs diverge rearwardly. When the plow is arranged for transport, both gangs are elevated out of operative position and the median line of the plow is perpendicular to the arch bar 13, with the parallel portions of the beams of each gang lying in vertical planes at the opposite side of such median line from the other gang and forming an equal acute angle therewith. This angular relation of the two gangs to each other is a fixed or constant one, and is not altered by the raising or lowering of the gangs, which move up and down in vertical planes that diverge rearwardly at a predetermined angle to each other. It should be explained that by the median line of the plow I refer to the longitudinal center line of the draft frame, or in other words, a line intersecting the pivot 29 and the center of the arch bar 13.

For raising and lowering the gangs A, B and supporting them when they are elevated, the arch bar 13 is provided with two bails 86, 87 pivotally mounted thereon at opposite sides of the center thereof, preferably by means of brackets 88, 89 secured to the rear face of the vertical flange 13ᶜ of the arch bar 13, as best shown in Fig. 1. As shown in Fig. 7, these bails are provided with rearwardly extending arms 90 that are connected by links 91 with the several beams, each arm being disposed so that it substantially overlies one of said beams. Obviously, by rocking the bails to swing their arms 90 upward or downward, the gangs will be lifted or lowered. As shown in Fig. 6, the links 91 are preferably composed of two members spaced apart at their lower ends to form a yoke 92 which embraces the beam and is connected therewith by a pivot bolt 93. The outer arm 90 of the bail 86 at the right hand side of the plow is connected with the crank 52 at that side by means of an extensible thrust rod 94, the lower end of which is connected with the crank 52 by a connection in the nature of a universal joint. As best shown in Fig. 6, this connection comprises a sleeve 94ᵃ journaled on the crank 52 and pivotally connected with the thrust rod by a pivot 94ᵇ which is disposed perpendicularly to the axis of the sleeve 94ᵃ. The purpose of this arrangement is to prevent binding action of the sleeve 94ᵃ on the crank pin as the crank rotates by providing universal joint action between the crank and the thrust rod 94. It will be noted that the wheels are not mounted on axes that are strictly horizontal, but are inclined slightly to give the wheels some degree of gather, so that the wheel that is running on the land will be substantially perpendicular when the plow is at work, and the wheel that is in the furrow will have the desired stagger to hug the corner formed by the bottom of the furrow and the furrow wall, and still not scrape the sides of the furrow wall. The crank therefore does not rotate in a true vertical plane, and to avoid binding it is desirable that the connection between the thrust rod and the crank be sufficiently flexible to accommodate the relative movement of the parts. The thrust rod 94 is made in two parts, its upper part being preferably in the form of a screw-threaded rod 95 that screws into the lower portion of the thrust rod, which is tubular. The rod 95 is pivotally connected with the bail arm 90 by a collar 96 that embraces said rod and fits between spaced flanges 97, 98 that form a groove to receive it. The collar 96 is provided with laterally extending pins 96ᵃ, 96ᵇ that are journaled respectively in the arm 90 of the bail and in a bracket-like member 90ᵃ secured to the bail arm, as best shown in Fig. 5. The thrust rod 94 may therefore oscillate fore and aft during the rotation of the crank 52, and it will be evident that when said crank swings upwardly from the position shown in Fig. 6 it will thrust upwardly on the rod 94 and will thereby rock the bail 86 to lift the gang connected with it. When the crank rotates through the second half of its cycle it will of course lower said gang by rocking the bail 86 in the opposite direction. The depth at which the plow bottoms operate may be varied by adjusting the length of the thrust rod 94 and this is accomplished by rotating the rod 95 to screw it in or out of the lower portion of the rod 94. The cranks 18, 19 previously described are employed for this purpose. As shown in Figs. 1 and 6, the crank 18 is connected by a universal joint 99 with the upper end of the screw-threaded rod 95, so that by rotating said crank said rod may be rotated to adjust the length of the thrust bar 94 as a whole. The gang at the opposite side of the plow is provided with similar mechanism for raising and lowering it and adjusting the depth of plowing, such lifting mechanism being controlled by the clutch mechanism at that side.

The crank 19 provides for its depth adjustment. As the lifting devices at both sides of the plow are alike corresponding parts are designated by the same reference numerals, except as hereinbefore described.

It should be clear from the foregoing description that the two gangs may be raised or lowered alternately, or independently of each other, or both may be lifted to their inoperative position, the lifting or lowering of each gang being controlled by the adjacent ground wheel through the clutch mechanism associated therewith, but obviously only one gang is lowered to operative position at the same time. When the gangs are both lifted out of operative position the several parts are arranged as shown in Fig. 1, the axes of the ground wheels being then substantially in line with the arch bar 13, so that said wheels are parallel with the line of advance, and the side members 10, 11 of the draft frame being symmetrically disposed with reference to the center line of draft which is then coincident with the median line of the plow. Fig. 3 shows the left hand gang B lowered to operative position with the right hand gang A in its elevated position. When one of the gangs, as B, is lowered, which is accomplished by tripping the clutch lever to effect the rotation through one half of its cycle of the crank 52 connected with it, by the rotation of the left hand ground wheel 38, said gang drops to carry its plow bottoms into engagement with the ground, the beams 78, 79 thereof swinging downward about the pivot 85. This locates the center of resistance at the left hand side of the median line of the plow, which deflects the line of draft laterally in that direction and causes the draft frame to turn about the vertical pivot 29, the left hand end of the arch bar 13 relatively moving backward while its right hand end moves forward. This lateral deflection of the line of draft causes the draft connection comprising the link 26, the clevis 27 and the cross-head 31, to swing laterally in the same direction about the pivot 26ª, the pivot 29 and the forward end of the draft beam 12 moving similarly into the new line of draft. Bearing in mind that the cross-head 31 has laterally rigid connection with the draft link 26, this lateral swinging of the draft connection as a unit will move the right hand end of the cross-head rearwardly and its left hand end forwardly, which obviously, through the rods 61, 62, will angle both ground wheels to steer them toward a position of parallelism with the new line of draft and thereby direct the wheel 38 and the operating gang toward the normal central line of draft. This movement will continue under the force of the draft until the pivot 29 and the center of resistance of the operating gang come into substantial coincidence with the normal central line of draft, when the resumption of its normal position by the cross-head 31 will straighten up the ground wheels into parallelism with the line of advance, so that the plow will again travel straight ahead. This transverse movement of the plow carries the ground wheel 38 into the furrow back of the tractor wheel at that side and it continues to run in such furrow as long as the same gang is operating. The angling of the draft frame carries the inoperative gang laterally out of the way as the operating gang straightens up in parallelism with the line of advance as shown in Fig. 3. This angling of the draft frame also brings the ground wheels closer together, as shown in said figure.

This shifting movement above described is materially aided by the weight of the inoperative gang because the weight of such gang is carried by the connections above described, including its thrust rod 94 which, as best shown in Fig. 5, is inclined downwardly and forwardly to its connection with the crank 52. Through said rod the weight of the lifted gang applies a turning moment to the sleeve or spindle 40 of the bracket 39 which tends to turn it about its vertical pivot 50 as an axis, by reason of the fact that the connection of said thrust rod with the crank 52 is spaced inwardly from the pivot bolt 50 on which the bracket 39 is journaled. Thus the weight of either gang when lifted aids in angling the arch bar or frame with respect to the wheels. Obviously, the same result may be accomplished by positioning the ground wheels inside of the arch and supporting the weight of the gangs in front of the arch on thrust rods extending downwardly and rearwardly, which would tend to cause rotation of the sleeves 40 about their pivot bolts 50 in the same manner as in the illustrated construction.

If instead of the gang B the gang A were lowered into operative position, the draft frame would swing in the opposite direction to that shown in Fig. 3, but in that case also the center of resistance would be carried into coincidence with the same, or a common, line of draft as in the other case, but, of course, the center of the arch bar would then lie at the opposite side of the line of draft from that in which it is shown in Fig. 3. It will thus be seen that which ever gang is put into use the draft frame will, under the force of the draft, automatically swing laterally in the appropriate direction to bring its front pivot into the line of draft and to maintain such line in parallelism with the line of advance and in a longitudinal vertcal plane coincident with the center of power of the tractor or other drawing means.

It is desirable that means be provided to limit the extent to which the wheel spindles may be turned angularly with respect to the arch bar or draft frame, and for this purpose the wings 42 are provided with forwardly extending shoulders 101, 102 that are adapted to engage the end portions of the arch bar 13 when the wheels have been angled to the desired extent, as best shown in Figs. 1 and 3.

Preferably each gang is properly leveled when the parts of the plow are assembled, and no leveling adjustment is ordinarily required, but if desired such leveling may be accomplished by adjusting the connections between the beams 71, 79 and the inner arms of the bails with which they are connected, for which purpose I have shown such connections as comprising internally screw-threaded sleeves 103 carried by the bail arms and connected with said beams by vertical rods 104 screw-threaded at their upper ends, as shown at 105 in Fig. 5.

As shown in Fig. 1, several holes 30 are provided in the draft beam 12 so that the cross-head 31 may be shifted longitudinally of said draft beam by transferring the bolt 29 from one to another of said holes and correspondingly adjusting the sleeves 65, 66 on the rods 61, 62. The purpose of this adjustment is to adapt the plow for use with wider or narrower tractors and provide for nevertheless keeping the pivot of the draft frame in a normally central line of draft.

So far as I am aware no one has heretofore devised a two-way plow in which the gangs are connected with a draft frame supported on one or more dirigible ground wheels arranged to be automatically steered by lateral deflection of the line of draft, to direct them toward a position of parallelism with such deflected line of draft, and carry the center of resistance of either gang when operating toward a normally central line of draft. Furthermore, I believe it to be new also to provide a power lift plow of any type, or other agricultural implement, such as a cultivator, a drill, a harrow, etc., in which the power mechanism is arranged to turn with a ground wheel connected with a supporting frame to swing angularly with respect thereto, and is operatively connected to actuate lifting devices on said frame. Such subject-matter, therefore, is claimed broadly. In other respects also my invention is not limited to the specific construction shown and described, but includes such modifications thereof as would occur to those skilled in the art.

What I claim as my invention and desire to secure by Letters Patent, is—

1. A two-way plow comprising a frame, dirigible ground wheels at opposite sides of said frame for supporting the same, oppositely acting rearwardly divergent gangs connected with said frame for alternate movement into or out of operative position, means for supporting either of said gangs out of operative position, a hitch device for connecting the plow with suitable hauling means to swing laterally relatively thereto in either direction from a normally central trailing position, and draft operated means connected with said wheels and actuated by the lowering of either gang to its operative position, to control the position of said wheels.

2. A two-way plow comprising a frame, dirigible ground wheels at opposite sides of said frame for supporting the same, oppositely acting rearwardly divergent gangs connected with said frame in fixed angular relation to each other for alternate movement into or out of operative position, means for supporting either of said gangs out of operative position, a hitch device for connecting the plow with suitable hauling means to swing laterally relatively thereto in either direction from a normally central trailing position, and draft operated means including a laterally swinging member actuated by the lowering of either gang to its operative position, for controlling the position of said wheels.

3. A two-way plow comprising two oppositely acting gangs movable alternately into operative position, a frame for supporting either of said gangs out of operative position, dirigible ground wheels at opposite sides of said frame for supporting the same, separately operable lifting means carried by said frame for lifting either gang out of operative position, separate means each having a permanent operative connection with one of said ground wheels for operating said lifting means respectively, and means for connecting said frame and gangs with suitable hauling means to swing laterally relatively thereto in either direction from a normally central trailing position.

4. A two-way plow comprising two oppositely acting rearwardly divergent gangs movable alternately into operative position, a frame for supporting either of said gangs out of operative position, dirigible ground wheels at opposite sides of said frame for supporting the same, separately operable lifting means carried by said frame for lifting either gang out of operative position, separate automatically releasing clutch devices operable independently of each other by said ground wheels respectively for operating said lifting means respectively, and means for connecting said frame and gangs with suitable hauling means to swing laterally relatively thereto in either direction from a normally central trailing position.

5. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position when either gang is moved to operative position, and means operable by lateral deflection of the line of draft with respect to the line of advance for moving said wheels angularly relatively to said frame.

6. A two-way plow comprising two oppositely acting gangs separately movable in erative position, a frame for supporting either of said gangs out of operative position, the of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, whereby when either gang is moved to operative position the center of resistance of such gang will move into substantial coincidence with a common line of draft, and means operable by lateral deflection of the line of draft with respect to the line of advance for moving said wheels angularly relatively to said frame.

7. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, whereby when either gang is moved to operative position the center of resistance of such gang will move into substantial coincidence with a common line of draft, means operable by lateral deflection of the line of draft with respect to the line of advance for moving said wheels angularly relatively to said frame, separately operable lifting means carried by said frame for lifting either gang out of operative position, and separate means operable respectively by said ground wheels for operating said lifting means respectively.

8. A two-way plow comprising two oppositely acting gangs separately movable in rearwardly divergent vertical planes into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, whereby when either gang is moved to operative position the center of resistance of such gang will move into substantial coincidence with a common line of draft, means operable by lateral deflection of the line of draft with respect to the line of advance for moving said wheels angularly relatively to said frame, separately operable lifting means carried by said frame for lifting either gang out of operative position, and separate means operable respectively by said ground wheels for operating said lifting means respectively.

9. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position with the lowering of either gang to its operative position, and draft operated means for holding said wheels in substantial parallelism with the line of draft when either gang is lowered to such position.

10. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, and means actuated by the lowering of either gang into operative position and the consequent deflection of the line of draft, to turn said wheels toward a position of parallelism with such deflected line of draft.

11. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, and means utilizing the force of the draft incident to the lowering of either gang into operative position, and actuated by the consequent deflection of the line of draft, to turn said wheels toward a position of parallelism with such deflected line of draft, and for normally holding said wheels in parallelism with a central line of draft.

12. A two-way plow comprising two oppositely acting gangs movable alternately into operative position, a frame for supporting either of said gangs out of operative position, dirigible ground wheels at opposite sides of said frame for supporting the same, separate lifting means carried by said frame and operable independently of each other to lift said gangs respectively out of operative position, clutch mechanism associated with each of said wheels to turn angularly therewith, and means operable independently of each other by said clutch mechanisms respectively for operating said lifting means respectively.

13. A two-way plow comprising two oppositely acting rearwardly divergent gangs movable alternately into operative position, a frame for supporting either of said gangs out of operative position, ground wheels at opposite sides of said frame and connected therewith to turn angularly with respect thereto, means for connecting said frame and gangs with suitable hauling means to swing laterally relatively thereto in either direction from a normally central trailing position, whereby when either gang is moved to operative position the center of resistance of such gang will move into substantial coincidence with a common line of draft, means operable by lateral deflection of the line of draft with respect to the line of advance for moving said wheels angularly relatively to said frame, and means for limiting such angular movement.

14. A two-way plow comprising a frame including a rearwardly disposed transverse arch member, a draft member rigidly connected therewith, a draft element connected with said draft member by a vertical pivot and adapted to be connected with hauling means to swing laterally, ground wheels pivotally connected with the opposite end portions of said arch element to swing angularly relatively thereto about vertical axes with lateral deflection of the line of draft with respect to the line of advance, rearwardly divergent gangs pivotally connected with said draft member to swing vertically in fixed angular relation to each other, means carried by said frame for supporting either gang out of operative position, and draft operated means for guiding said ground wheels and normally holding them in substantial parallelism with the line of advance.

15. A two-way plow comprising a frame including a rearwardly disposed transverse arch member, a draft member rigidly connected therewith, a draft element connected with said draft member by a vertical pivot and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, means carried by said frame for supporting either gang out of operative position, and draft operated means for guiding said ground wheels and normally holding them in substantial parallelism with the line of advance, and for turning said wheels toward a position of parallelism with the line of draft when such line of draft is deflected laterally by the lowering of either gang into operative position.

16. A two-way plow comprising a frame including a rearwardly disposed transverse arch member, a draft member rigidly connected therewith, a draft element connected with said draft member by a vertical pivot and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, lifting devices on said frame separately operable to lift either gang out of operative position, means carried by said frame for supporting either gang out of operative position, draft operated means for guiding said ground wheels and normally holding them in substantial parallelism with the line of advance, and separate devices operable by said wheels respectively for respectively actuating said lifting devices.

17. A two-way plow comprising a frame including a rearwardly disposed transverse arch member, a draft member rigidly connected therewith, a draft element connected with said draft member by a vertical pivot and adapted to be connected with hauling means to swing laterally, ground wheels pivotally connected with the opposite end portions of said arch member to swing angularly relatively thereto about vertical axes, rearwardly divergent gangs pivotally connected with said draft element to swing vertically in fixed angular relation to each other, lifting devices on said frame separately operable to lift either gang out of operative position, means carried by said frame for supporting either gang out of operative position, draft operated means for normally holding said ground wheels in substantial parallelism with the line of advance, and for turning said wheels toward a position of parallelism with the line of draft when such line of draft is deflected laterally by the lowering of either gang into operative position, and separate devices operable by said wheels respectively for respectively actuating said lifting devices.

18. A two-way plow comprising a frame including a rearwardly disposed transverse arch member, a draft member rigidly connected therewith, a draft element connected with said draft member by a vertical pivot and adapted to be connected with hauling means to swing laterally, ground wheels pivotally connected with the opposite end portions of said arch member to swing angularly relatively thereto about vertical axes, rearwardly divergent gangs pivotally connected with said draft member to swing vertically in fixed angular relation to each other, means carried by said frame for supporting either gang out of operative position, and draft operated means for normally holding said ground wheels in substantial parallelism with the line of advance, including a cross-head connected with said draft element to swing laterally therewith, and rods respectively connecting the opposite end portions of said cross-head with said wheels respectively.

19. A power lift agricultural implement comprising a frame, a tool connected therewith, lifting devices on said frame operable to lift said tool, a ground wheel connected with said frame for angular movement with respect thereto, mechanism comprising co-acting clutch members associated with said ground wheel to turn angularly therewith, and means adapted to be operated by said clutch mechanism for actuating said lifting devices.

20. A power lift agricultural implement comprising a frame, a tool connected therewith, lifting devices on said frame operable to lift said tool, a ground wheel connected with said frame for angular movement with respect thereto, a clutch member connected with said wheel to rotate therewith, a second clutch member mounted to turn angularly with said wheel and adapted to be connected with said first mentioned clutch member, and means operable by said second clutch member to actuate said lifting devices.

21. A power lift agricultural implement comprising a frame, a tool connected therewith, lifting devices on said frame operable to lift said tool, a bracket connected with said frame to turn about a vertical axis, a wheel spindle supported by said bracket, a ground wheel mounted on said spindle, a clutch member connected with said wheel to rotate therewith, a second clutch member journaled on said bracket and adapted to be optionally connected with said first clutch member, and means operated by said second clutch member for actuating said lifting devices.

22. A power lift agricultural implement comprising a frame, a tool connected therewith, lifting devices on said frame operable to lift said tool, a bracket connected with said frame to turn about a vertical axis, a wheel spindle supported by said bracket, a ground wheel mounted on said spindle, a clutch member connected with said wheel to rotate therewith, a second clutch member journaled on said bracket and adapted to be optionally connected with said first clutch member, a crank shaft connected with said second clutch member to rotate therewith, and means connecting said crank shaft with said lifting devices for actuating the same.

23. A two-way plow comprising a draft frame having forwardly converging draft bars, a draft connection at the point of convergence of said bars, two oppositely acting rearwardly divergent gangs in fixed angular relation to each other movable alternately into operative position and adapted to be supported by said frame when out of operative position, and wheels supporting said frame and automatically steerable by the lowering of either gang to operative position and the consequent deflection of the line of draft, to bring the center of resistance of the operating gang into substantial coincidence with a common line of draft.

24. A two-way plow comprising a draft frame having forwardly converging draft bars, a draft connection substantially at the point of convergence of said bars and swingable laterally with respect to the draft frame, two oppositely acting rearwardly divergent gangs in fixed angular relation to each other and connected with said frame to move alternately into operative position and to be supported by said frame when out of operative position, and wheels supporting said frame and automatically steerable, by lateral movement of said draft connection, to turn to a position of parallelism with either gang when the same is operating.

25. A two-way plow comprising a frame having ground engaging means, two oppositely acting rearwardly divergent gangs connected with said frame in fixed angular relation to each other and movable alternately into operative position, means utilizing the force of the draft for steering said ground engaging means when a gang is moved to operative position, and means for connecting said frame and gangs with suitable hauling means to swing laterally relatively thereto in one direction or the other from a normally central trailing position, upon the lowering of either gang to operative position, whereby the center of resistance of such gang will automatically move into substantial coincidence with a common line of draft.

26. A two-way plow comprising a frame having wheels, two oppositely acting rearwardly divergent gangs connected with said frame in fixed angular relation to each other to move alternately into operative position, and a draft member having steering connection with said wheels, said draft member being located centrally with respect to said gangs and movable laterally with respect to said frame by the force of the draft when either gang is lowered to its operative position, to swing said frame laterally with respect to the line of advance and steer said wheels to bring the center of resistance of the operating gang into substantial coincidence with a common line of draft.

27. A two-way plow comprising a frame having dirigible wheels, two oppositely acting rearwardly divergent gangs connected with said frame in fixed angular relation to each other to move alternately into operative position, and means, including a movable draft connection centrally located with respect to said gangs, actuated by the lowering of either gang to its operative position to positively steer said wheels under the force of the draft to a position of parallelism with the operating gang and to swing said frame laterally with respect to the line of advance to bring the center of resistance of the operating gang into substantial coincidence with a common line of draft.

28. A power lift agricultural implement comprising a frame, implement tools connected therewith for alternate use, lifting devices on said frame operable to lift said tools, a dirigible ground wheel connected with said frame for angular movement with respect to said lifting devices, means utilizing the force of the draft for positively steering said wheel and holding the same in a steered position, and means operable by said ground wheel to actuate said lifting devices.

29. A power lift agricultural implement comprising a frame, implement tools connected therewith for alternate use, lifting devices on said frame operable to lift said tools, a dirigible ground wheel connected with said frame for angular movement with respect to said lifting devices, means, including a laterally swinging draft member, for steering said wheel by the direction and force of the draft, and means operable by said ground wheel to actuate said lifting devices.

30. A power lift agricultural implement comprising a frame, a tool connected therewith, lifting devices on said frame operable to lift said tool, a dirigible ground wheel connected with said frame for angular movement with respect to said lifting devices, means for steering said wheel, and means comprising coacting clutch members and a crank shaft movable angularly with said wheel and operable thereby to actuate said lifting devices.

31. A power lift agricultural implement comprising a frame, implement tools connected therewith for alternate use, lifting devices on said frame operable to lift said tools, a dirigible ground wheel connected with said frame for angular movement with respect to said lifting devices, means, including a draft member connected with said frame and with said wheel, for steering said wheel by the direction and force of the draft, and means operable by said ground wheel to actuate said lifting devices.

32. A power lift agricultural implement comprising a frame, a pair of tools connected therewith for alternate use, lifting devices on said frame operable to lift said tools, a dirigible ground wheel connected with said frame for angular movement with respect to said lifting devices, means, including a draft member connected with said frame and with said wheel, for steering said wheel by the direction and force of the draft, and means movable angularly with said wheel and operable thereby to actuate said lifting devices.

33. A two-way plow comprising a frame, dirigible wheels at opposite sides thereof, two oppositely acting gangs movable alternately into operative position, means for supporting either gang on said frame out of operative position, steering means for said wheels, draft means for said gangs movable laterally with respect to the line of advance by the force of forward draft when either gang is lowered to operative position, separately operable lifting devices for lifting said gangs, respectively, out of operative position, and traction operated devices operable either simultaneously or separately to actuate said lifting devices, respectively.

34. A two-way plow comprising a frame, oppositely acting gangs connected with said frame for alternate movement into or out of operative position, dirigible wheels supporting said frame at the sides thereof, separately operable lifting devices for said gangs, respectively, connections for actuating one of said lifting devices by power from one of said wheels and the other lifting device by power from the other wheel, said connections each comprising automatically releasing clutch mechanism mounted to turn angularly with said wheels, respectively, when they are steered.

35. A two-way plow comprising a frame, oppositely acting gangs connected with said frame for alternate movement into or out of operative position, dirigible wheels supporting said frame at the sides thereof, separately operable lifting devices for said gangs, respectively, connections for actuating one of said lifting devices by power from one of said wheels and the other lifting device by power from the other wheel, said connections being operable either simultaneously or separately.

36. A two-way plow comprising a frame, dirigible wheels at opposite sides thereof, two oppositely acting gangs movable alternately into operative position, means for supporting either gang on said frame out of operative position, draft means for said gangs movable laterally with respect to the line of advance by the force of forward draft when either gang is lowered to operative position, means connected with said wheels for steering the same by force of the draft, separately operable lifting devices for lifting said gangs, respectively, out of operative position, and traction operated devices operable either simultaneously or separately to actuate said lifting devices, respectively.

37. A two-way plow comprising a frame, wheels supporting said frame and movable angularly with respect thereto, oppositely acting rearwardly diverging gangs connected with said frame in fixed angular relation thereto for alternate movement into or out of operative position, means for connecting said frame with suitable hauling means to swing laterally relatively thereto in either direction from a normally central trailing position when either gang is moved to operative position, draft controlled means for steering said wheels, and means for supporting either gang on said frame, when inoperative, so that its weight aids in swinging the frame to move the center of resistance of the operating gang into substantial coincidence with a common line of draft.

38. A two-way plow comprising a frame including a transverse arch member, ground wheels connected with the end portions of said arch member to move angularly with respect thereto, oppositely acting rearwardly diverging gangs connected with said frame in fixed angular relation thereto for alternate movement into or out of operative position, means for connecting said frame with suitable hauling means to swing laterally relatively thereto in either direction from a normally central trailing position when either gang is moved to operative position, draft controlled means for steering said wheels to move them into parallelism with the operating gang, and means for supporting either gang on said frame, when inoperative, so that its weight aids in swinging the frame to move the center of resistance of the operating gang into substantial coincidence with a common line of draft.

39. A two-way plow comprising a frame and dirigible supporting means therefor, two oppositely acting gangs connected with said frame and movable alternately into operative position, a draft connection swingable on said frame substantially in the normal center line of the plow, and steering connections between said draft connection and said dirigible supporting means operable by the force of the draft, when either gang is lowered to operative position, to angle said supporting means with respect to the frame to cause such gang to move angularly with respect to the line of advance to bring its center of resistance into substantial coincidence with a common line of draft.

40. A two-way plow comprising two oppositely acting gangs movable alternately into operative position, and arranged at opposite sides of a central normal line of draft, means mounted on dirigible wheels for supporting either gang out of operative position, and a centrally located draft connection for applying drawing force to both of said gangs, said draft connection including draft controlled means for angling said wheels with respect to the operating gang to permit either gang to move laterally with respect to the line of advance, under the force of the draft, when said gang is lowered to operative position.

41. A two-way plow comprising two oppositely acting rearwardly divergent gangs in fixed angular relation to each other, supporting means adapted to support said gangs when they are out of operative position, dirigible wheels for said supporting means, a draft connection located substantially in the normal center line of the plow and movable with respect to said supporting means by the force of the draft when the line of draft is deflected laterally, and connections between said dirigible wheels and said draft connection operable by the movement of said draft connection resulting from the lowering of either gang to operative position, to bring said wheels and the operating gang into substantial parallelism with the line of draft.

42. An agricultural implement comprising a frame, two forwardly converging plow bottoms connected with said frame in fixed angular relation to each other, and adapted to be moved alternately into operative position, wheels supporting said frame and shiftable into substantial parallelism with either plow bottom when it is in operation, and means operated by the force of forward draft to control the angular position of said wheels.

43. A two-way plow comprising a frame supported on dirigible wheels, two oppositely acting rearwardly divergent gangs connected with said frame at opposite sides of the longitudinal center line of the plow in fixed angular relation to said frame to move alternately into operative position and to be supported by said frame when out of operative position, an angularly movable steering member adapted to be connected with suitable draft means and to be angled with respect to said frame by the force of the draft when either gang is lowered to operative position, and means connecting said steering member with said dirigible wheels and operable by the movement of said steering member resulting from the lowering of either gang to operative position, to angle said wheels with respect to the frame to a position of substantial parallelism with the operating gang.

44. A two-way plow comprising a frame, brackets pivotally mounted on said frame to swing in a substantially horizontal plane about vertical axes, supporting wheels for said frame carried by said brackets, oppositely acting rearwardly divergent gangs connected with said frame in fixed angular relation thereto for alternate movement into or out of operative position, means for connecting said frame with suitable hauling means to swing laterally relatively thereto in either direction from a normally central trailing position when either gang is moved to operative position, draft controlled means connected with said brackets for swinging the same horizontally to angle said wheels with respect to the frame, and ground wheel actuated lifting devices including inclined thrust members interposed between said brackets and the gangs, respectively, whereby the weight of either gang, when in inoperative position, tends to turn the bracket associated therewith about its vertical axis and aids in swinging the frame to move the center of resistance of the operating gang into substantial concidence with a common line of draft.

45. A two-way plow comprising a frame, brackets pivotally connected with said frame to swing in a substantially horizontal plane about vertical axes, supporting wheels for said frame carried by said brackets, cranks journaled in said brackets and adapted to be optionally rotated by said wheels, respectively, oppositely acting rearwardly divergent gangs connected with said frame in fixed angular relation thereto for alternate movement into or out of operative position, means for connecting said frame with suitable hauling means to swing laterally relatively thereto in either direction from a normally central trailing position when either gang is moved to operative position, draft controlled means connected with said brackets for swinging said brackets to angle said wheels with respect to the frame, and inclined thrust members interposed between said gangs and said cranks, each of said cranks being offset laterally with respect to the axis of the bracket associated therewith, whereby the weight of either gang, when in inoperative position, tends to turn the associated bracket on its pivot to aid in swinging the frame to move the center of resistance of the operating gang into substantial coincidence with a common line of draft.

CARL G. STRANDLUND.

CERTIFICATE OF CORRECTION.

Patent No. 1,864,958.  June 28, 1932.

CARL G. STRANDLUND.

It is hereby certified that error appears in the printed specification of the above numbered patent requiring correction as follows: Page 6, line 95, claim 3, after "wheels" insert the word respectively; page 7, line 5, after the word "in" insert the words rearwardly divergent vertical planes into op-, and line 8, strike out the words "the of said gangs out of operative position"; page 8, lines 61 and 62, claim 15, strike out the words "guiding said ground wheels and" and in line 62, after the word "holding" strike out the word "them" and insert instead said ground wheels, and line 102, claim 17, for "element" read member; and that the said Letters Patent should be read with these corrections therein that the same may conform to the record of the case in the Patent Office.

Signed and sealed this 11th day of October, A. D. 1932.

M. J. Moore,
Acting Commissioner of Patents.

(Seal)